US007041240B2

(12) United States Patent
Miyazawa et al.

(10) Patent No.: US 7,041,240 B2
(45) Date of Patent: May 9, 2006

(54) METHOD OF MANUFACTURING A HIGH PRESSURE DISCHARGE LAMP VESSEL

(75) Inventors: Sugio Miyazawa, Kasugai (JP); Michio Asai, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 291 days.

(21) Appl. No.: 10/331,000

(22) Filed: Dec. 27, 2002

(65) Prior Publication Data

US 2003/0096551 A1 May 22, 2003

Related U.S. Application Data

(62) Division of application No. 09/463,374, filed as application No. PCT/JP99/02777 on May 26, 1999, now Pat. No. 6,586,881.

(30) Foreign Application Priority Data

May 27, 1998 (JP) ................................ 10-145616

(51) Int. Cl.
*B29C 43/04* (2006.01)

(52) U.S. Cl. ...................................... 264/1.21; 264/618

(58) Field of Classification Search ................ 264/512, 264/516, 532, 291, 571, 614, 618, 63, 1.2, 264/1.21; 65/34, 110, 182.2, 292; 425/393, 425/388

See application file for complete search history.

(56) References Cited

U.S. PATENT DOCUMENTS 3,961,113 A * 6/1976 Marco ..................... 428/36.92
4,387,067 A 6/1983 Kobayashi et al.
4,396,857 A * 8/1983 Danko ......................... 313/634
4,451,418 A 5/1984 Furuta et al.
4,503,356 A 3/1985 Kobayashi et al.
4,891,555 A 1/1990 Ahlgren et al.
6,137,229 A 10/2000 Nishiura et al.
6,208,070 B1 3/2001 Sugimoto et al.
6,215,254 B1 4/2001 Honda et al.

FOREIGN PATENT DOCUMENTS

| | | |
|---|---|---|
| CN | 1054333 A | 9/1991 |
| EP | 0 443 964 A1 | 2/1991 |
| EP | 0 0443 675 A1 | 8/1991 |
| EP | 0 587 238 A1 | 3/1994 |
| GB | 2 085 650 A1 | 4/1982 |
| HU | 214 232 B | 9/1994 |
| JP | 6-20649 | 1/1994 |
| JP | 7-107333 | 4/1995 |
| JP | 7-192704 | 7/1995 |
| JP | 10-81183 | 3/1998 |
| JP | 11-167896 | 6/1999 |

* cited by examiner

*Primary Examiner*—Dionne A. Walls
*Assistant Examiner*—Carmen Lyles-Irving
(74) *Attorney, Agent, or Firm*—Burr & Brown

(57) ABSTRACT

A vessel according to the present invention is made of a transparent or translucent material and includes a main portion and end portions which are integrated into the main portion, respectively. At least a central area of the main portion has a thickness smaller than at the respective end portions and at the boundary areas of the respective end portions and the main portion. The inner diameter of the respective end portions is not more than about 2 mm.

7 Claims, 8 Drawing Sheets

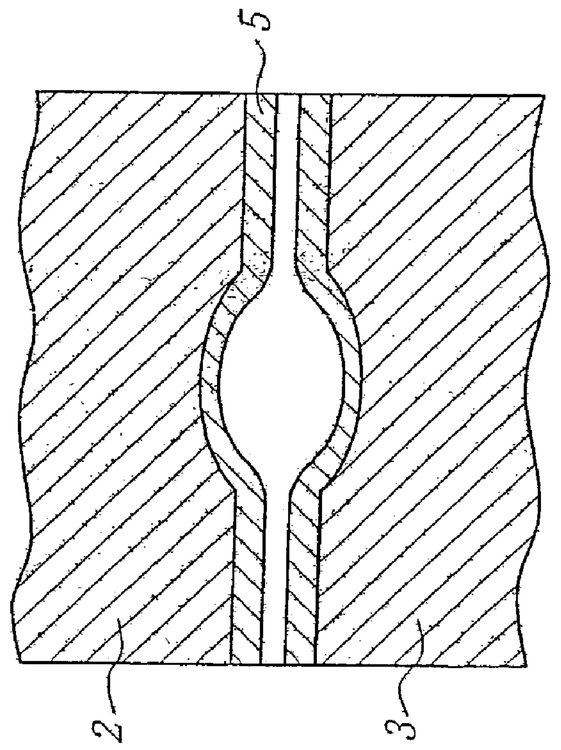
FIG. 1B - Prior Art
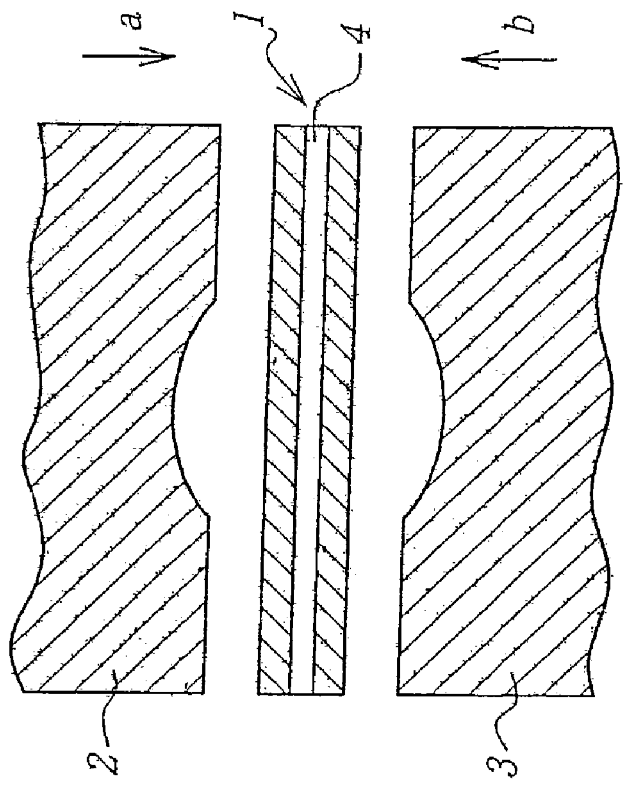
FIG. 1A - Prior Art

METHOD OF MANUFACTURING A HIGH PRESSURE DISCHARGE LAMP VESSEL

CROSS REFERENCE TO RELATED APPLICATION

This application is a divisional application of U.S. application Ser. No. 09/463,374 filed Apr. 10, 2000, now U.S. Pat. No. 6,586,881, which is a 371 of PCT/JP99/02777 filed on May 26, 1999 the entirety of which is incorporated herein by reference.

BACKGROUND OF THE INVENTION

1. Field of the Invention

The present invention relates to a vessel for a high pressure discharge lamp and a method of manufacturing the same. The present invention also relates to a high pressure discharge lamp having such a vessel and a method of manufacturing the same.

2. Description of the Related Art

Such a vessel is generally classified into two types. The vessel according to a first type is called as "integrated type vessel" and has a main portion forming a discharge space and end portions integrated into the main portion. The vessel according to a second type is called as "assembled type vessel" and has a main portion and separate end portions which are inserted into the respective openings of the main portion and thereby assembled with the main portion. However, the assembled type vessel cannot be used for a low watt type of high pressure discharge lamp because of a low lamp efficiency due to the heat loss at junctions of the main portion and the respective end portions. The assembled type vessel cannot be used for a high pressure discharge lamp either, because lamp efficiency is an important factor even for a middle-high watt type of high pressure discharge lamp. Therefore, when such lamps are to be manufactured, it has been considered necessary to use the integrated type lamp which does not suffer from the above-mentioned disadvantage of the assembled type vessels.

It is desirable that the transmittance of the lamp is as high as possible, so that at least a central area of the main portion of the vessel should be as thin as possible. On the other hand, it is desirable that the mechanical strength of the end portions to be inserted by the respective electrode members is as high as possible, so that the thickness of the end portions should be as large as possible. Also, as a light-emitting material tends to be collected and the proceeding of corrosion is fast in the neighborhood of boundary areas between the respective end portions and the main portion, it is preferable that the thickness of the neighborhood is as large as possible to mitigate adverse influence of corrosion and achieve prolonged lifetime. Therefore, by using a vessel having an entirely uneven thickness wherein main portion has a thickness at the central area which is smaller than at the respective end portions and at the boundary areas between the respective end portions and the main portion, it is possible to manufacture the lamp having a prolonged lifetime as compared to the lamp with a vessel having an entirely uniform thickness.

Conventionally, when the integrated type vessel is formed with a blow molding of the vessel as disclosed in JP-A-10-81183, for example, as shown in FIGS. 1A and 1B, a tubular shaped body 1 (FIG. 1A) made of a transparent or translucent ceramic material such as alumina is arranged between an upper half 2 and a lower half 3 of the mold, these mold halves 2, 3 are moved toward each other as shown by arrows a and b, respectively, to set the shaped body 1, and a pressure atmosphere such as air is introduced into an opening 4 of the shaped body 1 so as to obtain a blow-molded body 5 (FIG. 1B) of the vessel.

In the case of the blow molding process, it is possible to manufacture a vessel in which at least the central area of the main portion has a thickness smaller than at the respective end portions and at the boundary areas between the respective end portions and the main portion. However, it is necessary for the opening 4 to have a diameter enough to admit air into the opening 4. As a result, it is difficult for the inner diameter of the respective end portions to have a diameter smaller not more than a designated value of 2 mm, for example. Even if it is possible, it is still difficult for the main body of the vessel to keep a necessary inner diameter of 1–15 mm, for example.

In the case of the casting process disclosed in JP-A-7-107333, for example, as shown in FIGS. 2A to 2C, after a slurry 9 has been introduced into the mold 6 (FIG. 2A) from an opening 7 and coated over the inner surface 8 of the mold 6 (FIG. 2B), the excess slurry 9 is removed so as to obtain a molded body 10 (FIG. 2C).

In this case, it is possible to preserve the opening 7 with a diameter not more than 2 mm (but not less than 0.8 mm), since it is only necessary for the opening 7 to secure a diameter enough to remove the excessive the slurry 9. However, because of the nature of the casting process, it is impossible to form a vessel in which at least the central area of the main portion has a thickness smaller than at the respective end portions and at the boundary areas between the respective end portions and the main portion.

SUMMARY OF THE INVENTION

It is an object of the present invention to provide an improved vessel which mitigates the above-mentioned limitations of the prior art and has an uneven thickness as a whole so that at least the central area of the main portion has a thickness smaller than at the respective end portions and at the boundary areas between the respective end portions and the main portion.

It is another object of the present invention to provide a high pressure discharge lamp which has such an improved vessel.

It is still another object of the present invention to provide a method of manufacturing such an improved vessel and a method of manufacturing such a high pressure discharge lamp.

The vessel according to the present invention comprises a main portion forming a discharge space, and end portions to be inserted into respective electrode members, the main portion and the end portions being integrally made of a transparent or translucent material, at least a central area of the main portion having a thickness smaller than at the respective end portions and at boundary areas between the respective end portions and the main portion, and an inner diameter of respective end portions is not more than about 2 mm.

According to the present invention, at least a central area of the main portion has a thickness smaller than at the respective end portions, so that the central area has a relatively high transmittance and the mechanical strength is relatively high when gaps between the respective end portions and the respective electrode members are sealed with glass. As already described, the light-emitting material tends to be collected and the proceeding of corrosion is fast in a neighborhood of boundary areas between the respective end portions and the main portion, however, because the central areas of the main portion have a thickness smaller than at the boundary areas between the respective end portions and the main portion, the adverse influence of the corrosion is smaller than the case where it has a substantially uniform thickness as a whole. As a result, the life time of the vessel according to the present invention is prolonged as compared to that of a vessel which has a substantially uniform thickness as a whole and is manufactured by the casting process. Therefore, a lamp having the vessel according to the present invention has a prolonged lifetime.

In manufacturing a lamp having the vessel, as the diameter of the respective electrode members to be inserted into the respective end portions get larger, the heat loss becomes higher when the lamp is operated, and thus the lamp efficiency is aggravated. Such an adverse influence is remarkable especially when the integrated type vessel for low watt is used, and it is desirable to keep the diameter of the respective electrode members at a necessary minimum length. However, if the inner diameter of the respective end portions is much larger than the diameter of the respective electrode members, the light-emitting material can easily penetrate into the gaps between the respective end portions and the respective electrode members after manufacturing the lamp, and the color of the light emitted from the lamp may change, for example. Therefore, the gaps should be as small as possible, that is, if the inner diameter of the respective end portions is not much larger than the diameter of the respective electrode members in view of the characteristics (color, efficiency) of the lamp. As a result, the inner diameter of the respective end portions should be not more than about 2 mm.

The vessel according to the present invention is suitable for the low watt (e.g. 10 W, 20 W, 50 W) type of the lamp. It is also suitable for the middle watt (e.g. 70 W, 100 W, 150 W) type of the lamp and the high watt (e.g. 250 W, 400 W) type of the lamp in which the lamp efficiency is an important factor. However, if the middle or high watt type of the lamp is used for another type of the lamp in which color rendering is an important factor, for example, it is possible to improve the lamp efficiency and the lifetime as compared to the lamp having the vessel whose thickness is substantially uniform as a whole.

Preferably, the ratio of an axial length of the respective end portions to the inner diameter of the respective end portions is not less than 4. Thereby, it is possible to mitigate the thermal stress resulting from the difference between the thermal expansion of respective end portions and that of respective electrode members, and thus improve the reliability at sealing portions of the respective end portions.

As already described, in manufacturing the lamp having the vessel, as a diameter of the respective electrode members to be inserted into the respective end portions gets larger, the heat loss becomes higher when the lamp is operated, therefore the lamp efficiency is aggravated. To prevent such an aggravation, the outer diameter of the area of respective end portions neighboring the main portion should be not more than about 4 mm.

The lamp according to the present invention comprises a vessel, which itself comprises a main portion forming a discharge space, and end portions to be inserted respective electrode members. The main portions and the end portions are integrally made of a transparent or translucent material, at least a central area of the main portion has a thickness smaller than at the respective end portions and at boundary areas between the respective end portions and the main portions, and an inner diameter of respective end portions is not more than about 2 mm.

As the lamp according to the present invention has such a vessel, the limitation of the inner diameter of the respective end portions is smaller than that of the conventional vessel, the transmittance of at least the central area of the main portion becomes high, the lifetime of the lamp is prolonged, and good characteristics (color, efficiency) are obtained.

Furthermore, in order to mitigate the thermal stress resulting from the difference between the thermal expansion of respective end portions and that of respective electrode members, and improve the reliability at the sealing portions of the respective end portions, the ratio of an axial length of the respective end portions to the inner diameter of the respective end portions may be not less than 4. Also, in order to prevent the aggravation of the lamp effect, the outer diameter of areas of the respective end portions adjacent to the main portion may be not more than about 4 mm.

There is also a method of manufacturing a vessel for a high discharge lamp, the vessel comprising a main portion forming a discharge space, and end portions to be inserted respective electrode members, the main portion and the end portions being made of a transparent or translucent material. The method comprises the steps of setting a tubular member made of a transparent or translucent material into a mold, the mold being air permeable at least locally, and decompressing a space between an outer face of the tubular member and an inner face of the mold with at least one portion of the mold being heated or cooled, to thereby bring the tubular member into contact with the mold so that the member has an outer shape which coincides with the inner face of the mold.

According to the present invention, the tubular member made of a transparent or translucent material is set into the mold which is air permeable at least locally, the space between the outer face of the tubular member and the inner face of the mold is compressed with at least one portion of the mold being heated or cooled, to thereby bring the tubular member into contact with the mold so that the member has an outer shape which coincides with the inner face of the mold. As the vessel has such a shape, the limitation of the inner diameter of the respective end portions is smaller than that of the conventional vessel, and it is possible to keep the inner diameter of the main portion at not more than 2 mm which cannot be realized in conventional manner.

The vessel manufactured by the method of the present invention is suitable for the low watt type of the lamp. It is also suitable for the middle watt type of the lamp and the high watt type of the lamp in which the efficiency is an important factor. However, if the middle or high watt type of the lamp is used for another type of the lamp in which the color rendering is an important factor, for example, it is possible to improve the lamp efficiency and the lifetime compared with the lamp having the vessel whose thickness is substantially uniform as a whole.

Preferably, the member, which has been brought into contact with the mold, is subjected to stretching so that at least a central area of the main portion has a thickness smaller than at the respective end portions and at boundary areas of the respective end portions and the main portion. Thereby, the central area has a high transmittance and a prolonged lifetime.

Preferably, in the setting step, the inner diameter of a portion of the member corresponding to the respective end portions is not more than about 2 mm. Thereby, the characteristics of the lamp is improved.

Preferably, the member, which has been brought into contact with the mold, is subjected to stretching so that a ratio of an axial length of the respective end portions to the inner diameter of the respective end portions is larger than 4. Thereby, it is possible to mitigate the thermal stress resulting from the difference between the thermal expansion of the respective end portions and that of the respective electrode members, and thus improve the reliability at the sealing portions of the respective end portions.

Preferably, the outer diameter of the respective end portions adjacent to the main portions is reduced furthermore after the member is molded into a certain shape. More preferably, the outer diameter is not more than about 4 mm. The aggravation of the lamp efficient is prevented in such a way.

Moreover, the lamp can be manufactured by inserting the respective electrode members into the respective end portions of the vessel manufactured by the above-mentioned method.

BRIEF DESCRIPTION OF THE DRAWINGS

Embodiments of the vessel and the method of manufacturing the same will be explained below with reference to the accompanying drawings.

FIGS. 1A and 1B are sectional views for showing the blowing formation.

DETAILED DESCRIPTION OF THE INVENTION

Figure 2A:
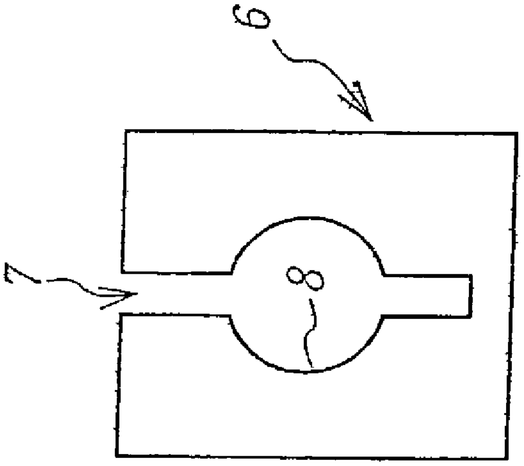
FIG. 2A Prior Art
FIGS. 2A to 2C are sectional views for showing the casting formation.
Figure 2B:
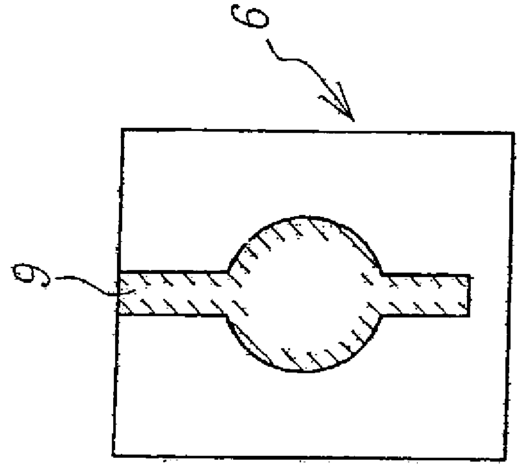
FIG. 2B Prior Art
Figure 2C:
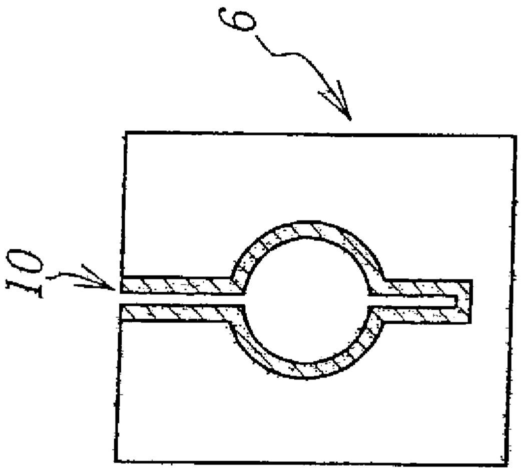
FIG. 2C Prior Art
Figure 3:
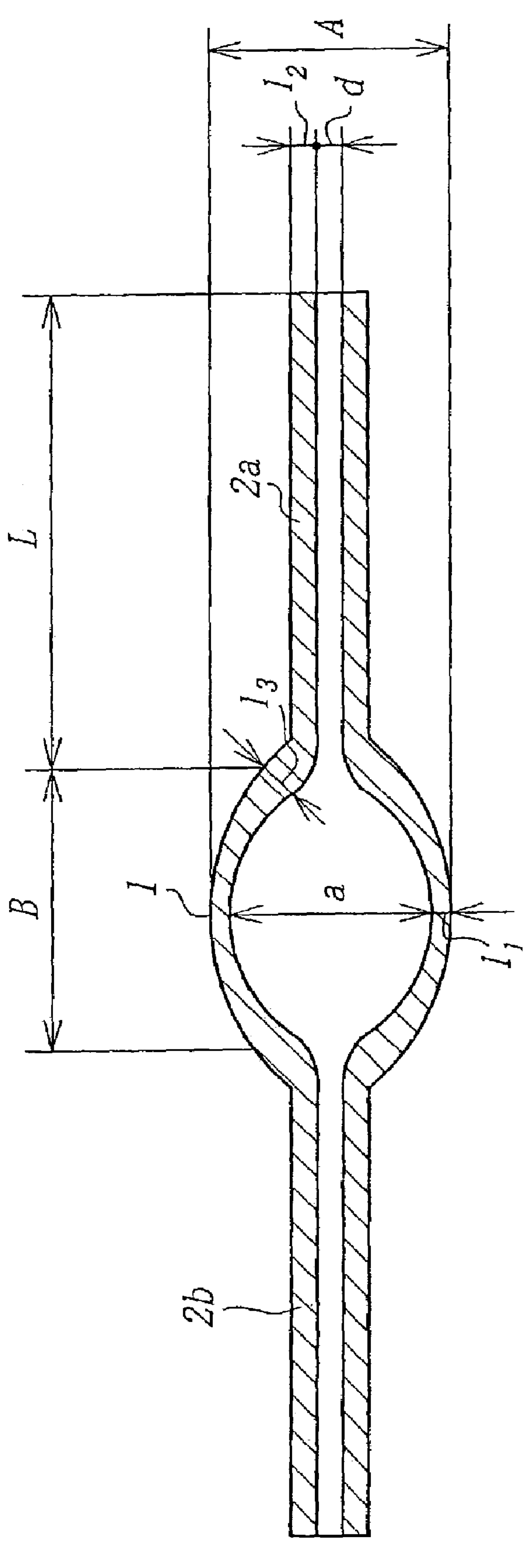
FIG. 3 is a sectional view for showing an embodiment of the vessel according to the present invention.

FIG. 3 is a sectional view for showing an embodiment of the vessel according to the present invention. The vessel comprises a substantially spherical main portion 1 forming a discharge space, and end portions 2*a*, 2*b* to be inserted respective electrode members. The main portion 1 and the end portions 2*a*, 2*b* are integrally made of a transparent or translucent material.

In the embodiment, then outer diameter A, the inner diameter a and the axial length B of the main portion 1 are 2–30 mm, 1–15 mm and 2–50 mm, respectively.

The respective end portions 2*a*, 2*b* have an axial length L of 10–20 mm and an inner diameter d of 0.5–2.5 mm. Therefore, the ratio of the length L to the inner diameter d is 4–40. It is preferable to set the ratio within such a range in view of the occurrence of the thermal stress resulting from the difference between the thermal expansion of the respective end portions 2*a*, 2*b* and that of the respective electrode members to be inserted.

A wall thickness $\mathbf{1}_1$ (0.5–20 mm) of a central area of the main portion 1 is smaller than the wall thickness $\mathbf{1}_2$ (0.5–30 mm) of the respective end portions 2*a,* 2*b* and the wall thickness $\mathbf{1}_3$ (0.5–30 mm) of boundary areas of the respective end portions 2*a,* 2*b* and the main portion 1, resulting from the pressure difference between an inside and an outside of the vessel. As the vessel has such a shape, the inner diameter d is smaller than that of the conventional vessel, and it is possible to keep the inner diameter d at not more than 2 mm, which cannot be realized in a conventional manner. If the vessel is used for a low watt type of high pressure discharge lamp, it is possible to keep the inner diameter d at 0.2–0.7 mm.

As the wall thickness $\mathbf{1}_1$ is smaller than the wall thickness $\mathbf{1}_2$, the central area has a relatively high transmittance and the mechanical strength is relatively high when gaps between the respective end portions 2*a,* 2*b* and the respective electrode members are sealed with glass. Further, as the wall thickness $\mathbf{1}_1$ is smaller than the wall thickness $\mathbf{1}_2$, an adverse influence of corrosion is reduced. As a result, the lamp having the vessel may have a prolonged lifetime.

Moreover, if the inner diameter d is not more than 2 mm, it is possible to reduce the gaps between the respective end portions 2*a*, 2*b* and the respective electrodes to be inserted after manufacturing the lamp. As a result, the characteristics of the lamp are improved.

Figure 4A:
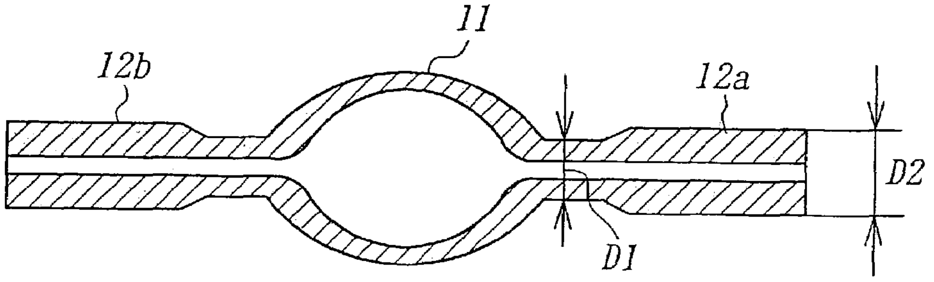
FIGS. 4A to 4D are sectional views for showing modifications of the vessel according to the present invention.

FIGS. 4A to 4D are sectional views for showing modifications of the vessel according to the present invention. The vessel as shown in FIG. 4A comprises a main portion 11 and end portions 12*a*, 12*b*, each of which is integrated into the main portion 11 and has a stepped shape.

In a lamp comprising such a vessel, as the outer diameter D1 of the respective end portions 12*a*, 12*b* adjacent to the main portion 11 get larger, the heat loss becomes higher when the lamp is operated, therefore the lamp efficiency is aggravated. Therefore, the outer diameter of the respective end portions 12*a*, 12*b* should be as small as possible. Especially, if the lamp comprises the low watt type of the vessel, the adverse influence of the heat loss is serious, and if the outer diameter D1 is not less than 4 mm, it is difficult to obtain a sufficient lamp efficiency. On the other hand, if the outer diameter D1 is not more than 1 mm, disadvantages, such as cracks may occur when manufacturing the lamp because the vessel is not thick enough. As a result, the outer diameter D1 is set to 1–4 mm.

Furthermore, as the outer diameter D2 at the point of the respective end portions 12*a*, 12*b* is larger than the outer diameter D1, the mechanical strength of the respective end portions 12*a*, 12*b* is improved.

Figure 4B:
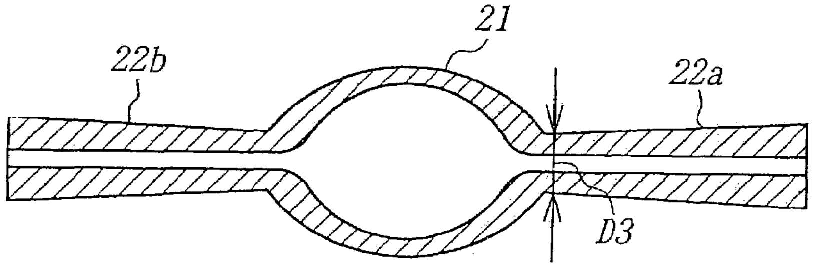

The vessel as shown in FIG. 4B comprises a main portion 21 and end portions 22*a*, 22*b*, each of which is integrated into the main portion 21 and has a substantial taper shape. In this case, also, the outer diameter D3 at areas of the respective end portions 22*a*, 22*b* adjacent to the main portion 21 is set to 1–4 mm in view of the lamp efficiency and the mechanical strength.

Figure 4C:
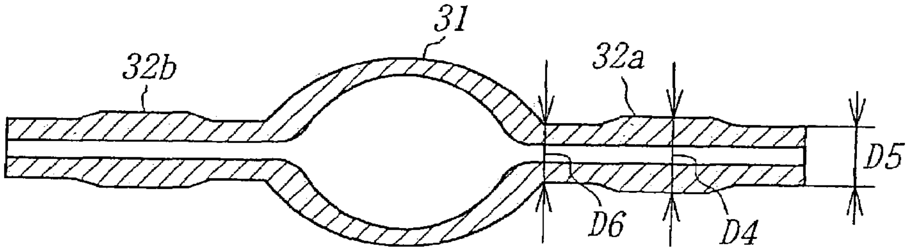

The vessel as shown in FIG. 4C comprises a main portion 31 and end portions 32*a*, 32*b*, each of which is integrated into the main portion 31 and has a partially stepped shape.

If the respective electrode members to be inserted into the respective end portions 32*a*, 32*b* comprises a niobium member, a molybdenum member and a tungsten member, a region of the respective end portions inserted the respective molybdenum members need to have a greater mechanical strength than that of the respective end portions inserted the respective niobium member and the respective tungsten member. Therefore, the outer diameter D4 or the thickness of a region of the respective end portions inserted the respective molybdenum members is larger than those of the regions of the respective end portions inserted the respective niobium member and the respective tungsten member.

On the other hand, if the flow of sealing material, such as glass, at areas adjacent to the top of the respective end portions 32a, 32b is verified by a visual observation, the thickness at the top of the respective end portions 32a, 32b should be as small as possible. Because the difference between the coefficient of thermal expansion of the transparent or translucent ceramic material such as alumina and that of niobium is comparatively small, it is not necessary to have a comparatively high mechanical strength. Therefore, disadvantages such as cracks, hardly occur when sealing the gaps between the respective end portions and the respective electrode members to be inserted even if the thickness or the outer diameter D5 of a region adjacent to the top of the respective end portions is smaller than an outer diameter D4.

As a result, it is advantageous to use such a vessel if the respective electrode members to be inserted into the respective end portions comprises the niobium member, the molybdenum member and the tungsten member. In this case, also, the outer diameter D6 of areas of the respective end portions 32a, 32b adjacent to the main portion 31 is 1–4 mm in view of the lamp efficiency and the mechanical strength.

Figure 4D:
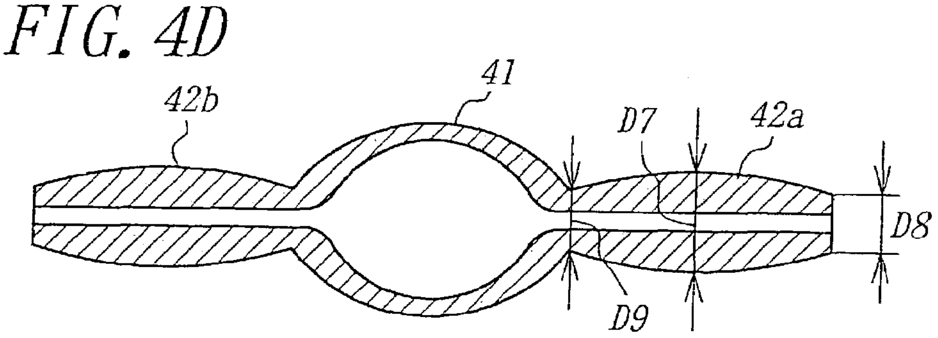

The vessel as shown in FIG. 4D comprises a main portion 41 and end portions 42a, 42b, each of which is integrated into the main portion 41 and has a substantial spindle shape. In this case, also, it is especially advantageous to use the respective electrode members which comprises the niobium member, the molybdenum member and the tungsten member because the outer diameter D7 of a region of the respective end portions inserted the respective molybdenum members is larger than those of regions of the respective end portions inserted the respective niobium member and the respective tungsten member, and the outer diameter D8 of a region adjacent to a top of the respective end portions is smaller than the outer diameter D7. The outer diameter D9 of areas of the respective end portions 42a, 42b adjacent to the main portion 41 is 1–4 mm in view of the lamp efficiency and the mechanical strength.

Shapes of end portions as shown in FIGS. 3 and 4A–4D are formed as described below, such as by grinding. The method of manufacturing the vessel will be described below.

Figure 5:
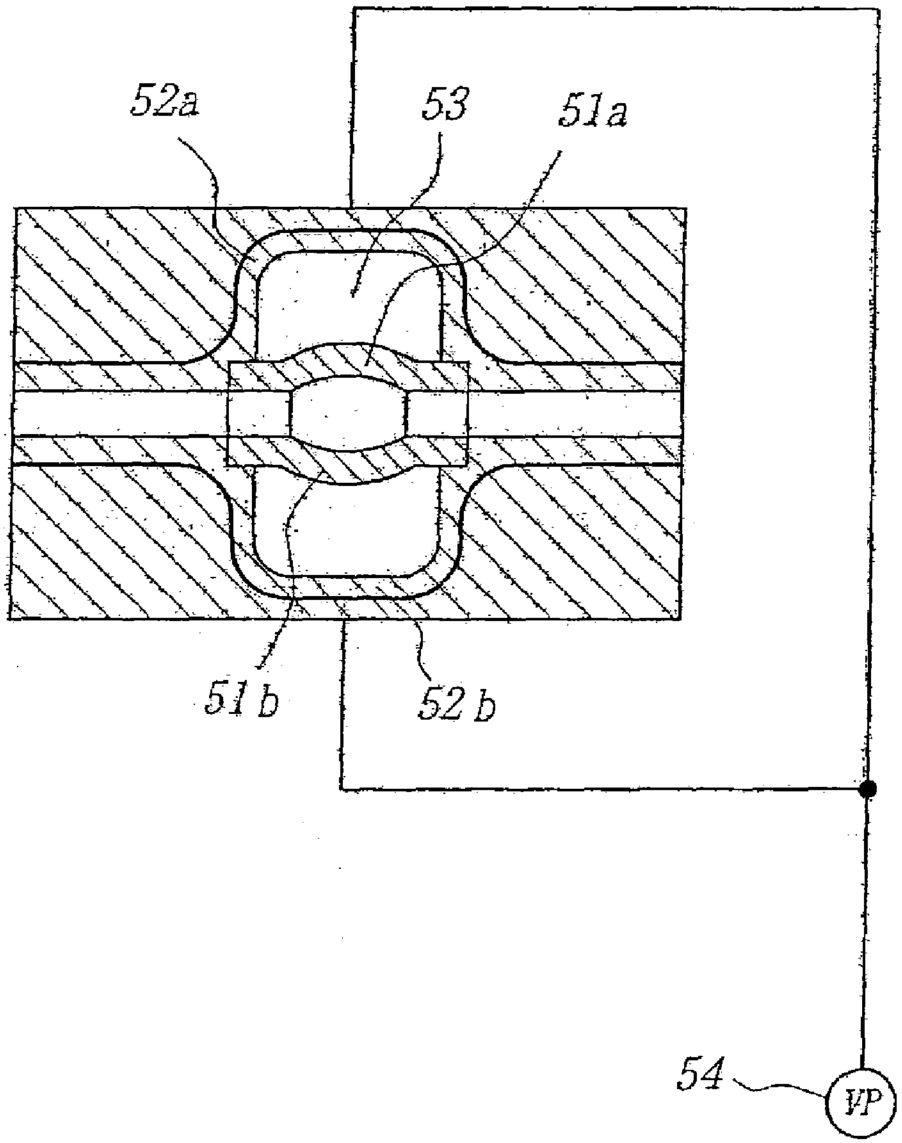
FIG. 5 is a view for showing an embodiment of the method of manufacturing the vessel according to the present invention.
Figure 6:
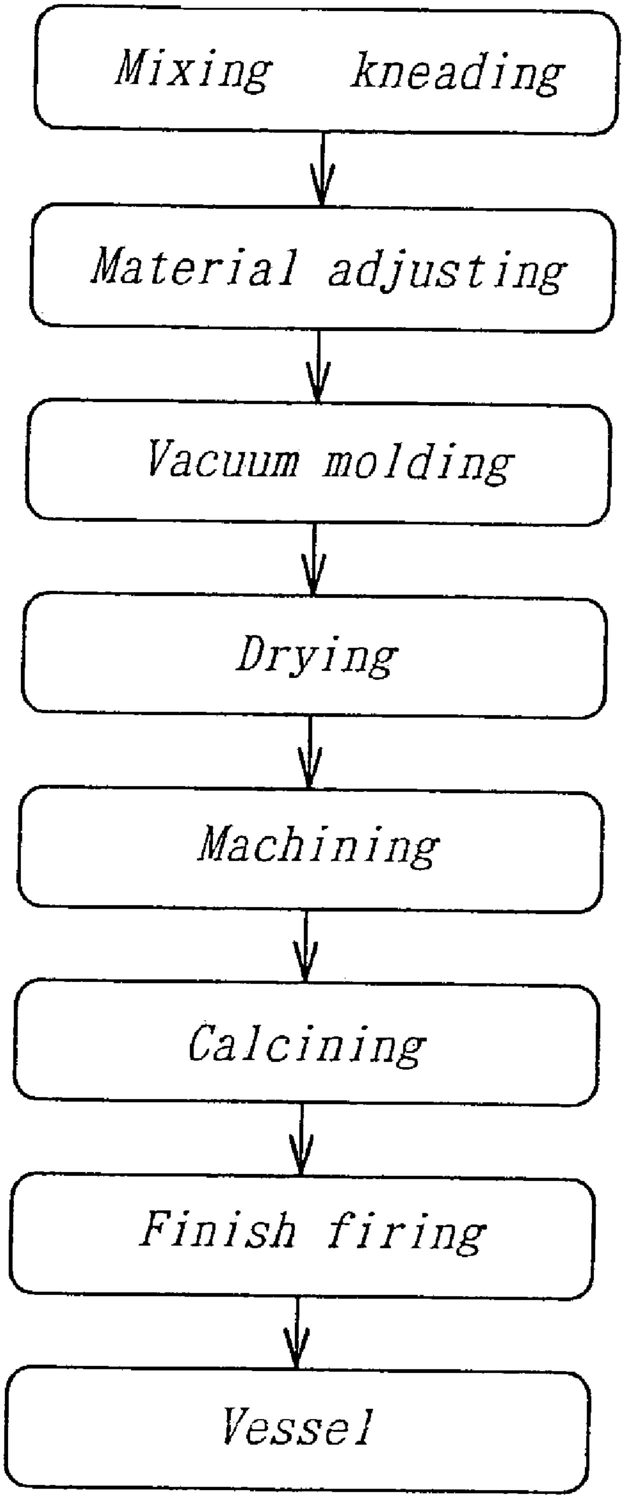
FIG. 6 is a flow chart for illustrating an embodiment of the method of manufacturing the vessel according to the present invention.

FIG. 5 is a view showing an embodiment of the method of manufacturing the vessel according to the present invention, and FIG. 6 is a flow chart illustrating an embodiment of the method of manufacturing the vessel according to the present invention. A mold for forming the vessel in FIG. 5 has a vacuum chamber 53 which is formed by cores 51a, 51b having an air permeability and packings 52a, 52b adhered to the respective cores 51a, 51b. At least the cores 51a, 51b are heated or cooled during the molding of the vessel.

The respective cores 51a, 51b may be any core which has air permeability. To be concrete, the cores 51a, 51b should be formed by a porous member whose surface has a plurality of holes, by combining a plurality of fine grained beads to each other using a self fusion, a binder or the like, by bending, and gathering one or more wires as well as press molding the gathered wires into a desirable shape, by a porous panting metal, by plastic forming a mesh member into a desirable shape, by forming a plurality of holes onto a molding material as used conventionally, and so on.

First, to alumina powder having high purity of not less than 99.9 percentage are added 750 ppm of magnesium oxide, 4 weight percentage of methyl cellulose, 2 weight percentage of polyethylene oxide, 5 weight percentage of stearic acid and 23 weight percentage of water, and the resulting mixture is kneaded in a kneader mill for 15 minutes.

Then, the resulting kneaded mixture is procured to obtain a tubular shaped body (not shown) and the molded body is fixed between the core 51a and the packing 52a, as well as the core 51b and packing 52b. The body fixed in such a manner is sucked with a vacuum pump 54 and then molded so as to contact the body onto surfaces of the core 51a, 51b. As a result, the end portions and the main portion are formed along the molding shape to obtain the integrated type vessel.

The thus obtained body is dried, machined (e.g. the end portions are ground), calcined and then finish fired in vacuum or an $H_2$ atmosphere to obtain the vessel as shown in FIGS. 3, 4A, 4B, 4C or 4D.

Figure 7:
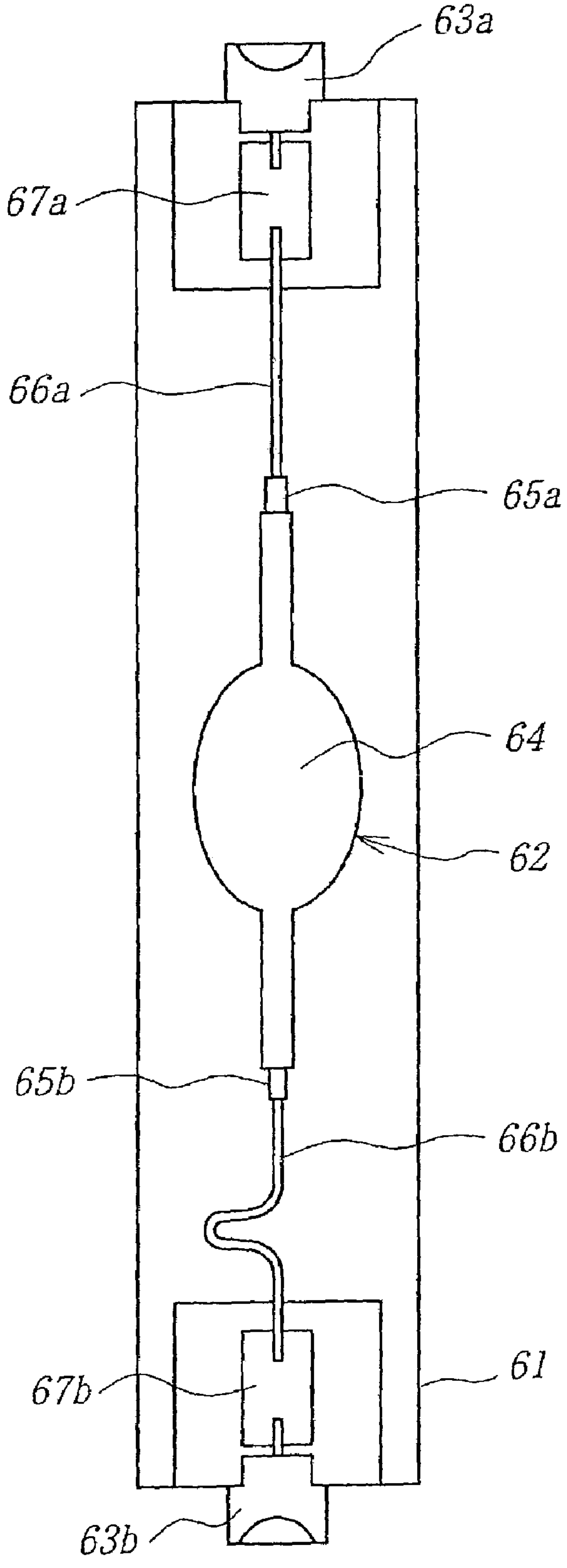
FIG. 7 is a view for showing an embodiment of the high pressure discharge lamp according to the present invention.

FIG. 7 is a view showing an embodiment of the high pressure discharge lamp according to the present invention. The high pressure lamp includes an outer tube 61 made of quartz glass or hard glass, and a ceramic discharge tube 62 is placed in the outer tube 61 coaxially thereto.

Both ends of the outer tube 61 are tightly sealed with respective caps 63a, 63b. The ceramic discharge tube 62 comprises a vessel 64 as shown in FIG. 3, and electrode members 65a, 65b inserted into end portions of the vessel 64 so that the one end of the respective electrode members 65a, 65b is exposed to an inner space formed by a main portion of the vessel 64 and the other thereof is exposed to outside of the vessel. The respective electrode members 65a, 65b may have any known structure.

The ceramic discharge tube 62 is held by the outer tube 61 via two lead wires 66a, 66b. The lead wires 66a, 66b are connected to the respective caps 63a, 63b via the respective foils 67a, 67b.

Figure 8:
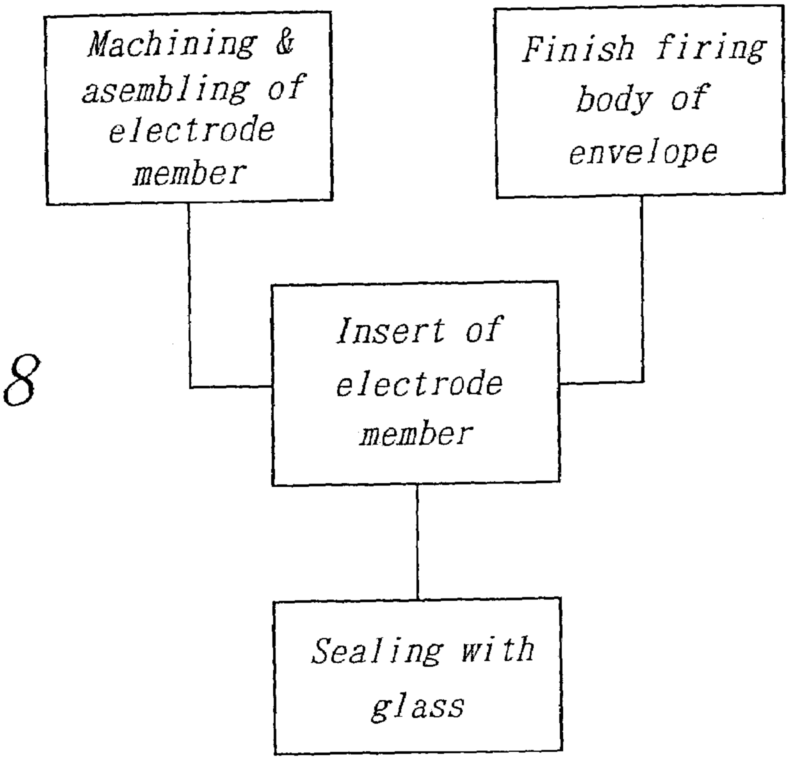
FIGS. 8 and 9 are flow charts for illustrating embodiments of the method of manufacturing the vessel according to the present invention.

FIG. 8 shows a flow chart illustrating a first embodiment of the method of manufacturing the vessel according to the present invention. In this process, the electrode members are machined or assembled at the same time, before or after a finish fired body of the vessel is obtained in accordance with the manufacturing process as shown in FIG. 6. Then, the respective electrode members are inserted into the respective end portion of the vessel, and the gap between the respective electrode members and the respective end portions is sealed with glass.

Figure 9:
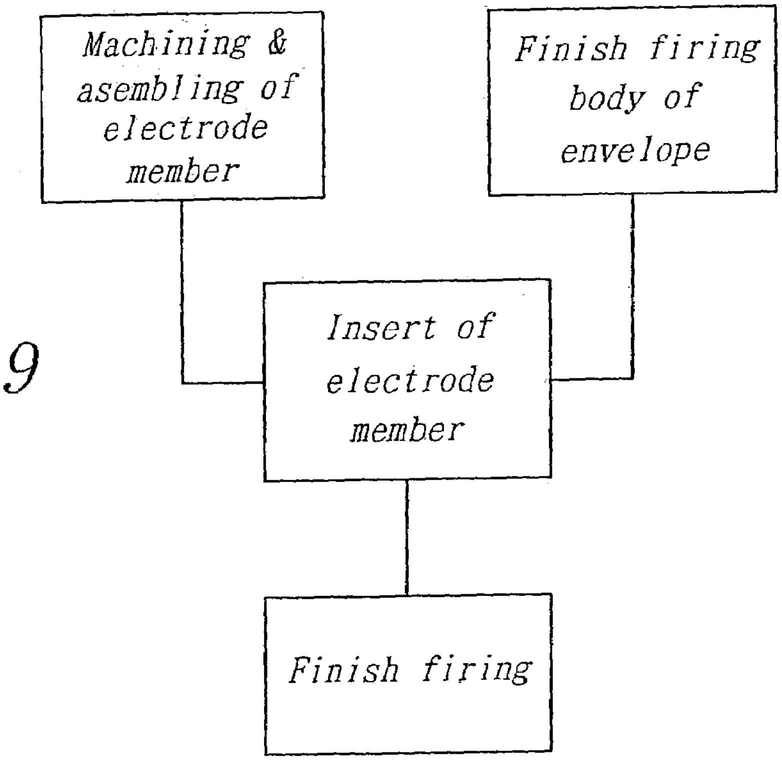

FIG. 9 shows a flow chart illustrating a second embodiment of the method of manufacturing the vessel according to the present invention. In this process, the electrode members are machined or assembled at the same time, before or after a finish fired body of the vessel is obtained in accordance with the manufacturing process as shown in FIG. 6. Then, the respective electrode members are inserted into the respective end portion of the vessel, and the respective electrode members and the respective end portions are co-fining into an integrated body.

While the present invention has been described above with reference to certain preferred embodiments, it should be noted that they were presented by way of examples only and various changes and/or modifications may be made without departing from the scope of the invention. For example, the main portion of the vessel has the spindle shape, however it may have any other shape such as a tubular or spherical shape. Any other transparent or translucent material, such as yttria or quartz, is used instead of alumina.

In manufacturing the vessel according to the present invention, the atmospheric pressure between the mold and the molded body may be lower than that of an inner pressure of the molded body instead of sucking with the vacuum pump. The end portions may be formed by stretching after the vacuum forming.

The lamp according to the invention may have the vessel as shown in FIGS. 4A–4D instead of that as shown in FIG. 3. It is also possible to obtain the lamp according to the invention using other known manufacturing processes. For example, the gap between the respective electrode members and the respective end portions may be welded instead of sealing with glass or co-firing into the integrated body.

What is claimed is:

1. A method of manufacturing a vessel for a high pressure discharge lamp, said vessel comprising a main portion forming a discharge space, and end portions into which respective electrode members are inserted, said main portion and said end portions being integrally made of a transparent or translucent material, comprising the steps of:

providing a mold comprising a core made of an air permeable material and a plurality of packing members surrounding said core and defining a vacuum chamber between an inner surface of at least a portion of said packing members and an outer surface of said core;

providing a tubular member made of a transparent or translucent material;

setting said tubular member into said core of said mold;

heat-treating at least said core of said mold; and decompressing a space between an outer surface of said tubular member and an inner surface of said core to thereby bring said tubular member into contact with said core so that an outer shape of said tubular member coincides with said inner surface of said core.

2. The method according to claim 1, further comprising a step of stretching said tubular member, which has been brought into contact with said mold, so that at least a central area of said main portion has a smaller wall thickness than a wall thickness at said respective end portions of said vessel and a wall thickness at a boundary area of each said respective end portion and said main portion.

3. The method according to claim 1, wherein in said setting step, an inner diameter of a portion of said tubular member corresponding to said respective end portions is not more than about 2 mm.

4. The method according to claim 1, further comprising a step of stretching said tubular member, which has been brought into contact with said mold, so that a ratio of an axial length of said respective end portions to said inner diameter of said respective end portions is larger than 4.

5. The method according to claim 1, further comprising a step of reducing an outer diameter of said respective end portions adjacent to said main portions after said tubular member is molded into a certain shape.

6. The method according to claim 5, wherein said outer diameter of said respective end portions adjacent to said main portions is reduced to be not more than about 4 mm.

7. A method of manufacturing a high pressure discharge lamp, comprising a step of inserting respective electrode members into said respective end portions of a vessel manufactured according to the method of claim 1.

* * * * *